United States Patent
Cai et al.

(10) Patent No.: US 9,869,281 B2
(45) Date of Patent: Jan. 16, 2018

(54) BI-FUEL VEHICLE

(71) Applicant: GM GLOBAL TECHNOLOGY OPERATIONS LLC, Detroit, MI (US)

(72) Inventors: Mei Cai, Bloomfield Hills, MI (US); Anne M. Dailly, West Bloomfield, MI (US); Mahmoud H. Abd Elhamid, Troy, MI (US)

(73) Assignee: GM GLOBAL TECHNOLOGY OPERATIONS LLC.

( * ) Notice: Subject to any disclaimer, the term of this patent is extended or adjusted under 35 U.S.C. 154(b) by 336 days.

(21) Appl. No.: 14/845,332

(22) Filed: Sep. 4, 2015

(65) Prior Publication Data
US 2017/0067415 A1    Mar. 9, 2017

(51) Int. Cl.
*F02M 25/08*   (2006.01)
*F02M 37/00*   (2006.01)
*F02B 43/10*   (2006.01)
*F02M 21/02*   (2006.01)
*B60K 15/03*   (2006.01)

(52) U.S. Cl.
CPC ......... *F02M 25/0854* (2013.01); *F02B 43/10* (2013.01); *F02M 37/0088* (2013.01); *B60K 2015/03105* (2013.01); *F02B 2043/103* (2013.01); *F02M 21/0218* (2013.01); *F02M 21/0221* (2013.01)

(58) Field of Classification Search
CPC .......... F02M 21/0218; F02M 21/0221; F02M 37/0088; F02M 25/08; F02B 43/10; F02B 2043/103; B60K 2015/03105
See application file for complete search history.

(56) References Cited

U.S. PATENT DOCUMENTS

| | | | |
|---|---|---|---|
| 3,001,376 A | 9/1961 | Webster | |
| 5,658,013 A * | 8/1997 | Bees | B60K 15/03 280/831 |
| 5,673,939 A * | 10/1997 | Bees | B60K 1/04 280/831 |
| 5,884,610 A | 3/1999 | Reddy | |
| 6,612,458 B2 | 9/2003 | Balzer et al. | |

(Continued)

FOREIGN PATENT DOCUMENTS

WO    WO 2013/130401    9/2013

OTHER PUBLICATIONS

"OPW 11A and 11B Automatic Nozzles", OPW, pp. 144-145.

(Continued)

*Primary Examiner* — Erick Solis
*Assistant Examiner* — Anthony L Bacon

(57) ABSTRACT

A bi-fuel vehicle includes an Internal Combustion Engine (ICE) to power the vehicle by combustion of liquid and gas-phase fuels. The vehicle has a dual fuel tank including a pressurizable gas-phase fuel compartment defined by a wall that is permeable by a gas-phase fuel. The gas-phase fuel compartment receives and contains the gas-phase fuel, and supplies the gas-phase fuel for combustion in the ICE. The dual fuel tank includes a liquid fuel compartment to receive and contain liquid fuel, and supply the liquid fuel for combustion in the ICE. A shell envelops the gas-phase fuel compartment, and defines the liquid fuel compartment. An interstitial space between the wall and the shell is in one-way fluid communication with the liquid fuel compartment. The interstitial space receives the permeated gas-phase fuel and channels the permeated gas-phase fuel to the liquid fuel compartment. The dual fuel tank has a vapor recovery system.

20 Claims, 2 Drawing Sheets

(56) References Cited

U.S. PATENT DOCUMENTS

| | | | |
|---|---|---|---|
| 8,342,283 B2 | 1/2013 | Rolfe et al. | |
| 2008/0035238 A1* | 2/2008 | Keip | F17C 11/005 |
| | | | 141/200 |
| 2011/0061622 A1* | 3/2011 | Lund | F02B 13/00 |
| | | | 123/1 A |
| 2014/0053800 A1* | 2/2014 | Steffen | F02D 41/0025 |
| | | | 123/304 |
| 2014/0278001 A1 | 9/2014 | Miller et al. | |
| 2015/0330332 A1* | 11/2015 | Bonelli | F02M 21/0221 |
| | | | 123/445 |
| 2016/0097348 A1* | 4/2016 | Abd Elhamid | F02D 19/0647 |
| | | | 123/445 |
| 2017/0067425 A1* | 3/2017 | Abd Elhamid | F02B 11/02 |
| 2017/0145960 A1* | 5/2017 | McDonald | F02M 21/0206 |

OTHER PUBLICATIONS

Adewole,J,K.,et al.,"Dev. of a Mathematical Model for Natural Gas Permeation Through Polymer Nanocomposites at High Pressure and Temp.", Jrnl of Nano Res.,vol. 21,2013,pp. 95-101.
"Gasoline Dispenser Nozzle Spouts", J285, Surface Vehicle Recommended Practice, SAE International, Jan. 1999, 4 pages.
"Recommended Practice for Compressed Natural Gas Vehicle Fuel", J1616, Surface Vehicle Recommended Practice, SAE International, Feb. 1994, 18 pages.
"Automotive Gasolines", J312, Surface Vehicle Recommended Practice, SAE International, Feb. 2001, 40 pages.
"Diesel Fuels", J313, Surface Vehicle Standard, SAE International, Jul. 2004, 46 pages.

\* cited by examiner

BI-FUEL VEHICLE

BACKGROUND

Some internal combustion engines (ICEs) are designed to operate on a particular fuel. For example, an ICE may be designed to operate on regular unleaded gasoline with an Octane Rating of 87, or diesel grade 1-D. ICEs in flex fuel vehicles run on gasoline or gasoline-ethanol blends of up to 85% ethanol (E85).

Multi-fuel engines are capable of operating on multiple fuel types. For example, bi-fuel engines are capable of operating on two different fuel types. One fuel type may be a liquid phase fuel including gasoline, ethanol, bio-diesel, diesel fuel or combinations thereof that are delivered to the bi-fuel engine substantially in a liquid state. The other fuel type may include an alternative fuel, e.g., Compressed Natural Gas (CNG), Liquefied Petroleum Gas (LPG), hydrogen, etc. In existing bi-fuel vehicles, the two different fuels are stored in separate tanks, and the bi-fuel engine may run on one fuel at a time, or may alternatively run on a combination of the two different fuel types.

SUMMARY

A bi-fuel vehicle includes an Internal Combustion Engine (ICE) to provide motive power to the vehicle by combustion of a liquid fuel and a gas-phase fuel. The vehicle has a dual fuel tank including a pressurizable gas-phase fuel compartment defined by a wall. A gas-phase fuel is permeable through the wall. The pressurizable gas-phase fuel compartment is to receive the gas-phase fuel, contain the gas-phase fuel, and supply the gas-phase fuel for combustion in the ICE. The dual fuel tank includes a liquid fuel compartment to receive liquid fuel, contain the liquid fuel, and supply the liquid fuel for combustion in the ICE. A shell envelops the pressurizable gas-phase fuel compartment, and defines the liquid fuel compartment. An interstitial space is defined between the wall and the shell. The interstitial space is in one-way fluid communication with the liquid fuel compartment. The interstitial space is to receive the permeated gas-phase fuel and channel the permeated gas-phase fuel to the liquid fuel compartment. A vapor recovery system is in fluid communication with the liquid fuel compartment.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
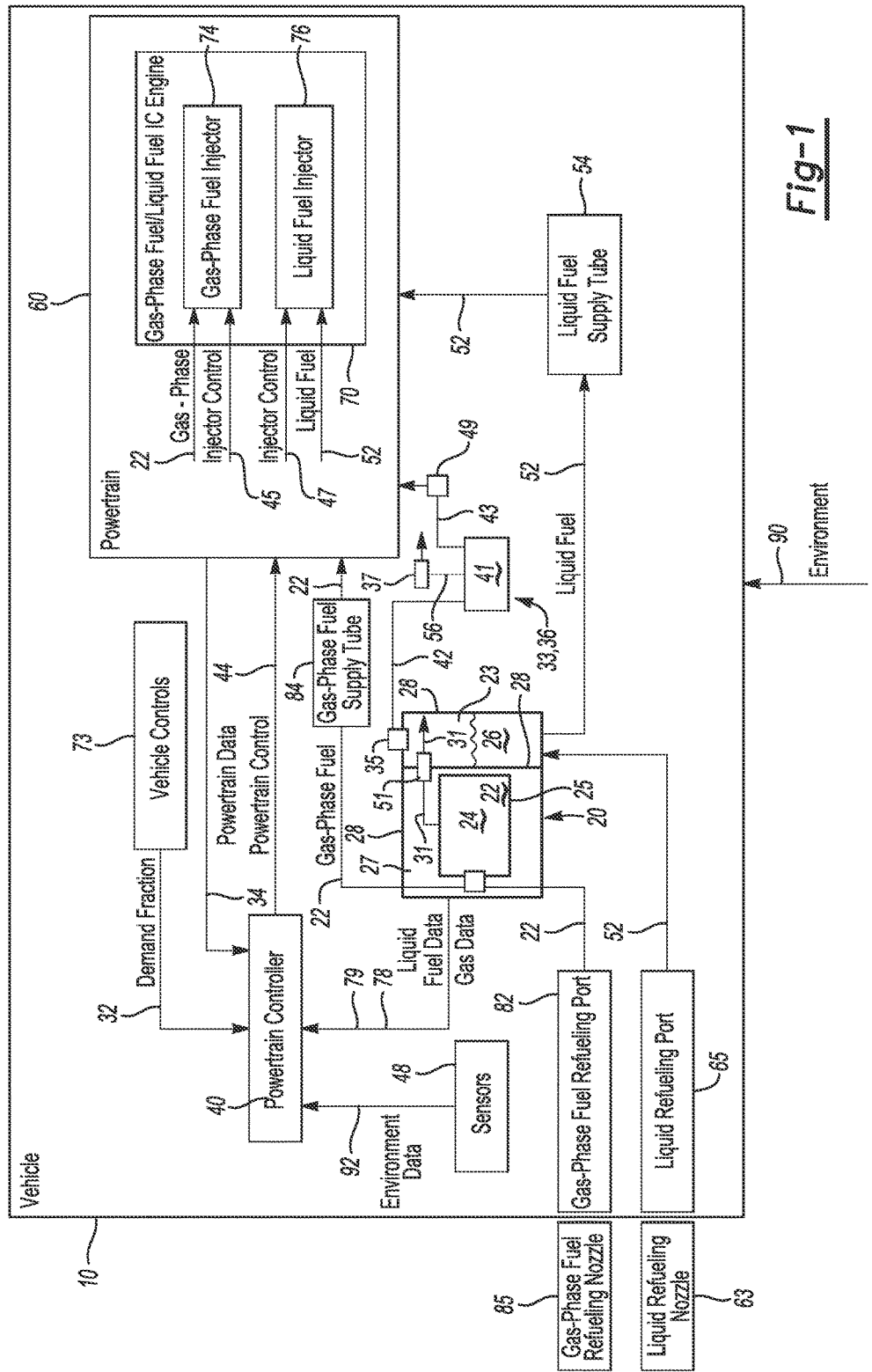
FIG. 1 is a system block diagram depicting an example of a bi-fuel vehicle according to the present disclosure.

Internal combustion engines (ICEs) combust fuel inside an engine to perform work. Some ICEs are used in vehicles to provide motive power to the vehicles. As used herein, vehicle means a self-propelled mobile machine that transports passengers or cargo. Examples of vehicles according to the present disclosure are: motor vehicles (motorcycles, cars, trucks, buses, trains), and watercraft (ships, boats).

In some cases, ICEs are defined by the type of fuel that the ICEs are designed to consume. For example, some diesel engines may run on diesel grade 1-D, or diesel grade 2-D. Gasoline engines may typically run on gasoline. Bi-fuel engines may be compatible with two types of fuel, for example, gasoline and natural gas. Flex-fuel vehicles (FFVs) may run on a range of combinations of gasoline and ethanol.

In examples of the present disclosure, a natural gas solute may be dissolved in a liquid fuel solvent. The solution of the natural gas solute in the liquid fuel solvent has more energy per volume than the liquid solvent fuel alone. For example, the energy available in a gallon of gasoline may be increased by dissolving natural gas in the gasoline. The solution of natural gas and gasoline does not increase the volume of the gasoline substantially; however, the energy density of the solution is greater than the energy density of the gasoline.

Some existing bi-fuel vehicles have a tank for storing gas-phase fuel and a separate tank for storing liquid fuel. In sharp contrast, examples of the bi-fuel vehicle of the present disclosure store the gas-phase fuel and the liquid fuel in compartments of the same dual fuel tank. A small amount of the gas-phase fuel may permeate through a wall of the pressurizable gas-phase fuel compartment into an interstitial space defined between the wall of the pressurizable gas-phase fuel compartment and a shell that envelops the gas-phase fuel compartment and defines the liquid fuel compartment. The liquid fuel compartment and the interstitial space are separated by a portion of the shell.

As used herein, permeation means the penetration of a permeant (such as the gas-phase fuel) through a solid (for example, the wall) that has no holes. The process of permeation includes diffusion through the solid and may involve phenomena such as adsorption, dissociation, migration and desorption. Permeation is directly related to the concentration gradient of the permeant, the solid's intrinsic permeability, and the mass diffusivity of the permeant and the solid.

Permeation is different from leakage. Leakage obeys the dynamic gas laws. This means that light gases will penetrate a leak at a higher rate than a heavier gas. The amount of gas passing through a leak will then be governed by the conductance of the leak and the molecular weight of the gas. The dynamic gas laws apply to any leak mechanism, from pinholes to long labyrinthine passages. A leak is free passage through the solid via a channel or orifice. Permeation, on the other hand, is a process including sorption on the internal surface, diffusion through the solid, and resorption on the external surface before the permeant can desorb into the space on the opposite side of the solid.

A permeable solid is not the same as a porous solid. A porous solid may have cracks, gaps, and spaces or holes in the solid to provide a conduit for leakage. A common experience of permeation occurs with a latex balloon filled with helium. Even though the balloon has no holes or leaks, a latex balloon may, due to permeation, lose most of the helium contained in the balloon within a day or two.

Permeation is, in part, from the diffusion of the permeant molecules, through a membrane or interface. Permeation is related to diffusion. The permeant moves from high concentration to low concentration across the interface. A material with permeability to certain materials and no permeability to other materials is referred to as semipermeable. Only molecules or ions with certain properties will be able to diffuse across through a semipermeable material. Permeation can occur through most materials including metals, ceramics and polymers. However, the permeability of metals is much lower than that of ceramics and polymers due to the crystal structures of the metals.

Permeability depends on the temperature of the interaction as well as the characteristics of both the solid and the permeant component. Through the process of sorption, molecules of the permeant can be either absorbed or adsorbed at the interface.

In examples of the present disclosure, the gas-phase fuel may permeate through the wall of the pressurizable gas-phase fuel compartment into the interstitial space. A check valve may be disposed in the shell to allow one-way flow of gas from the interstitial space into the liquid fuel compartment. When the pressure in the interstitial space is high enough to open the check valve, the permeated gas-phase fuel flows into liquid fuel compartment. The ullage space is vented by the liquid discriminating vent valve to maintain a relatively low pressure in the ullage space. Permeation is directly related to a pressure difference across a permeable membrane. Since the pressure in the ullage space is kept relatively low, permeation losses from the dual fuel tank are low. In examples, the pressure in the ullage space may be kept less than 10 inches of water gage pressure relative to the atmospheric pressure around the vehicle.

In examples of the present disclosure, the bi-fuel vehicle may have an emission of hydrocarbon less than about 2 grams when tested in accordance with a diurnal plus hot soak test procedure based on the Sealed Housing for Evaporative Determination (SHED) as set forth in Title 40, Code of Federal Regulations, sections 86.130-78 through 86.143-90 as they existed Jul. 1, 1989. In an example of the present disclosure, the portion of the emission of hydrocarbon contributed by the dual fuel tank may be less than about 0.01 grams.

In examples of the present disclosure, a portion of the permeated gas-phase fuel is dissolved, or absorbed, in the liquid fuel stored in the liquid fuel compartment of the pressurizable tank. The amount of gas-phase fuel stored in the liquid fuel depends on the temperature of the solution and the pressure in the ullage space. Another way that the permeated gas-phase fuel is stored in the liquid fuel compartment is as a gas in the ullage space. It is to be understood that none of the fuels disclosed herein are in a supercritical state in the pressurizable tank. Therefore, the gas will rise above a surface of the liquid in the tank. As used herein, the ullage space is the volume in the pressurizable tank that is not occupied by the liquid. Also as used herein, the ullage space increases in volume as the volume of the liquid in the pressurizable tank decreases. The gas-phase fuel in the ullage space will reach an equilibrium pressure equal to the vapor pressure of the gas-phase fuel dissolved in the solution. Since the gas-phase fuel may be a mixture of constituent gases, each of the constituent gases will tend toward an equilibrium partial pressure equal to the partial vapor pressure of the constituent dissolved in the solution. As used herein, the partial pressure of the gas-phase fuel means the sum of the partial pressures of each of the constituent gases in the gas-phase fuel. It is to be understood that the liquid fuel may also have volatile components with vapor pressures. The total pressure in the ullage space of the tank is the sum of the partial pressures of all of the gases in the ullage space.

ASTM International, known until 2001 as the American Society for Testing and Materials (ASTM), is an international standards organization that develops and publishes voluntary consensus technical standards for a wide range of materials, products, systems, and services. One method of measuring vapor pressure is by the test method ASTM-D-323, which determines Reid Vapor Pressure (RVP). RVP is a measure of the volatility of volatile crude oil and volatile nonviscous petroleum liquids, except liquefied petroleum gases. It is defined as the absolute vapor pressure exerted by a liquid at 100° F. (37.8° C.) as determined by the test method ASTM-D-323.

It is to be understood that the liquid fuel in examples of the present disclosure is not limited to petroleum liquid fuel. The liquid fuel may include, for example, biodiesel or bio-ethanol or other alcohols. Although ethanol may be produced from petroleum (by hydrolysis of ethylene), most ethanol is produced from agricultural products. As such, ethanol may be a petroleum liquid fuel or a non-petroleum liquid fuel. Biodiesel is produced from agricultural products. Petroleum liquid fuels include gasoline, kerosene, diesel fuel and other similar liquid fuels.

SAE International, initially established as the Society of Automotive Engineers (SAE), is a U.S.-based, globally active professional association and standards organization for engineering professionals in various industries.

According to SAE Surface Vehicle Standard J313, Diesel Fuels, Jul. 28, 2008, automotive and railroad diesel fuels, in general, are derived from petroleum refinery products which are commonly referred to as middle distillates. Middle distillates represent products which have a higher boiling range than gasoline and are obtained from fractional distillation of the crude oil or from streams from other refining processes. Finished diesel fuels represent blends of middle distillates. The properties of commercial distillate diesel fuels depend on the refinery practices employed and the nature of the crude oils from which they are derived. Thus, they may differ both with and within the region in which they are manufactured. Such fuels generally boil over a range between 163° C. and 371° C. (325° F. to 700° F.). Their makeup can represent various combinations of volatility, ignition quality, viscosity, sulfur level, gravity, and other characteristics. Additives may be used to impart special properties to the finished diesel fuel.

ASTM D 975 includes five grades of diesel fuel: Grade No. 1-D; Grade Low Sulfur No. 1-D; Grade No. 2-D; Grade Low Sulfur No. 2-D; and Grade 4-D.

SAE Surface Vehicle Recommended Practice J312, Automotive Gasolines, Feb. 1, 2001, summarizes the composition of automotive gasolines, the significance of their physical and chemical characteristics, and the pertinent test methods for defining or evaluating these properties.

As used herein, liquid fuels are fuels that are generally in a liquid phase at standard ambient temperature 25° C. and pressure (100 kPa absolute). It is to be understood that even though liquid fuels are generally in the liquid phase, the liquid fuels may be volatile, and may completely evaporate if left in an open container for a certain amount of time. As used herein, liquid fuels have boiling points that are higher than 25° C. It is to be understood that some liquid fuels are blends of a plurality of component liquid fuels. In examples of the present disclosure, the liquid fuel may include a petroleum liquid fuel, a biodiesel, an alcohol, or combinations thereof.

As used herein, gas-phase fuels are fuels that are generally in a gas phase at standard ambient temperature 25° C. and pressure (100 kPa absolute). Natural gas, methane, propane, and hydrogen are examples of gas-phase fuels. In an example of the present disclosure, the gas-phase fuel is a natural gas. SAE Surface Vehicle Recommended Practice J1616, Recommended Practice for Compressed Natural Gas Vehicle Fuel, issued February 1994, describes natural gas as follows: Natural gas is comprised chiefly of methane (generally 88 to 96 mole percent) with the balance being a decreasing proportion of non-methane alkanes (i.e., ethane, propane, butanes, etc.). Other components found in natural gas are nitrogen ($N_2$), carbon dioxide ($CO_2$), water, oxygen, and trace amounts of lubricating oil (from compressors) and sulfur found as hydrogen sulfide ($H_2S$) and other sulfur compounds. Before entering the commercial natural gas transmission system, natural gas is processed to meet limits on hydrogen sulfide, water, condensables of heavier hydrocarbons, inert gases such as $CO_2$ and $N_2$, and energy content. Mercaptan odorants (e.g., tertiary butyl mercaptan) are added by local distribution companies (LDC's) to add a human-detectable odor to natural gas which otherwise would be odorless.

In the examples disclosed wherein the gas-phase fuel is natural gas, the capacity of the gas-phase fuel compartment may be increased by incorporating a natural gas adsorbent into the gas-phase fuel compartment. The adsorbent in the gas-phase fuel compartment increases the storage capacity so that the gas-phase fuel compartment is capable of storing and delivering a sufficient amount of natural gas for desired vehicle operation.

As an example, at about 725 psi (50 bar), a vehicle including a 0.1 $m^3$ (i.e., 100 L) gas-phase fuel compartment according to the present disclosure filled with a suitable amount of a carbon adsorbent having a Brunauer-Emmett-Teller (BET) surface area of about 1000 $m^2/g$, a bulk density of 0.5 $g/cm^3$, and a total adsorption of 0.13 g/g is expected to have 2.85 GGE (gasoline gallon equivalent). For comparison, a 100L tank without adsorbent would have about 1.56 GGE of natural gas at the same pressure. Assuming a vehicle may have an expected fuel economy of 30 miles per gallon, 2.85 GGE will allow the vehicle to be operated over a distance range of about 85 miles.

It is believed that the adsorption effect of the quantity of adsorbent in the examples disclosed herein is high enough to compensate for any loss in storage capacity due to the skeleton of the adsorbent occupying volume in the gas-phase fuel compartment. For the same temperature and pressure, the density of the gas in the adsorbed phase is greater than the density of the gas in the gas phase. As such, the adsorbent will improve the gas-phase fuel compartment's storage capacity of natural gas at relatively low pressures (compared, for example, to the same type of gas-phase fuel compartment that does not include the adsorbent), while also maintaining or improving the gas-phase fuel compartment's storage capacity at higher pressures. Increased storage capacity may lead to improved vehicle range between refueling.

FIG. 1 is a system block diagram depicting an example of a vehicle 10 having a powertrain 60 with an internal combustion engine (ICE) 70 to provide motive power to the vehicle 10 by combustion of a liquid fuel 52 and a gas-phase fuel 22. The vehicle 10 is depicted in an environment 90. The vehicle 10 has sensors 48 that provide environmental data 92 to the powertrain controller 40. Examples of the environmental data 92 include ambient air pressure, temperature, and humidity. The vehicle 10 has a dual fuel tank 20. The dual fuel tank 20 includes a pressurizable gas-phase fuel compartment 24 defined by a wall 25. A gas-phase fuel 22 is permeable through the wall 25. The pressurizable gas-phase fuel compartment 24 is to receive the gas-phase fuel 22, contain the gas-phase fuel 22, and supply the gas-phase fuel 22 for combustion in the ICE 70. A liquid fuel compartment 26 is to receive liquid fuel 52, contain the liquid fuel 52, and supply the liquid fuel 52 for combustion in the ICE 70. A shell 28 envelops the pressurizable gas-phase fuel compartment 24 and defines the liquid fuel compartment 26.

An interstitial space 27 is disposed between the wall 25 and the shell 28. The interstitial space 27 is in one-way fluid communication with the liquid fuel compartment 26. The interstitial space 27 is to receive the permeated gas-phase fuel 31 and channel the permeated gas-phase fuel 31 to the liquid fuel compartment 26.

A liquid refueling port 65 is in fluid communication with the liquid fuel compartment 26 of the dual fuel tank 20 to selectably interface with a liquid refueling nozzle 63 to receive the liquid fuel 52 from the liquid refueling nozzle 63.

A gas-phase fuel refueling port 82 is in fluid communication with the pressurizable gas-phase fuel compartment 24 to selectably interface with a gas-phase fuel refueling nozzle 85 to receive the gas-phase fuel 22 from the gas-phase fuel refueling nozzle 85. A gas-phase fuel supply tube 84 is to convey the gas-phase fuel 22 from the pressurizable gas-phase fuel compartment 24 in the dual fuel tank 20 to the ICE 70. A liquid fuel supply tube 54 is to convey the liquid fuel 52 from the liquid fuel compartment 26 of the dual fuel tank 20 to the ICE 70.

Vapor evaporated from the liquid fuel 52 may mix with the permeated gas-phase fuel 31 in the ullage space 23. A liquid discriminating vent valve 35 vents the ullage space 23 of the liquid fuel compartment 26 to a vapor recovery system 33. The liquid discriminating vent valve 35 allows the gas from the ullage space 23 to be vented to the vapor recovery system 33 while preventing the liquid fuel 52 from flowing or being carried along with the gas flow stream through the liquid discriminating vent valve 35. The liquid discriminating vent valve 35 may have a rollover function to prevent fluid from leaking out of the liquid discriminating vent valve 35 if the dual fuel tank 20 is inverted. The vapor recovery system 33 may include an onboard refueling vapor recovery (ORVR) system 36.

The liquid fuel vapor evaporated from the liquid fuel 52, and liquid fuel vapor that is displaced during re-fueling operations are trapped for recovery in the ORVR system 36. The ORVR system 36 is also referred to herein as a vapor recovery system 33 because it may not be limited to recovery of refueling vapor. For example, the vapor recovery system 33 may capture the permeated gas-phase fuel 31 that is mixed with the vapor from the liquid fuel 52 in the ullage space 23. In the example depicted in FIG. 1, the fuel vapor is conveyed through vapor conduit 42 which opens into a canister 41 in which is disposed a volume of activated carbon having a fuel vapor adsorbing capacity. The fuel vapor is adsorbed on the activated carbon of the canister 41. Purge conduit 43 is provided between the ICE 70 and the canister 41. Vent conduit 56 is open into the canister 41 on a first end, with a second end opposing the first end exposed to ambient air. The vent conduit 56 may include a normally open vent valve 37 that may be selectively driven to a closed position in accordance with diagnostic or maintenance procedures. Purge valve 49, for example an electronically controlled solenoid valve, is disposed in the purge conduit 43. When the purge valve 49 is electrically driven to an open position, the canister 41 is exposed to vacuum from a running ICE 70, drawing ambient air through the vent conduit 56 to the canister 41, across the activated carbon thereof for drawing fuel vapor with the ambient air from the canister 41 and through the purge conduit 43 into the ICE 70 for combustion therein.

The liquid discriminating vent valve 35 and the vapor recovery system 33 prevent a total gas pressure in the ullage space 23 from exceeding a predetermined maximum ullage space gas pressure except during a liquid refueling shut-off event. As used herein, the liquid refueling shut-off event includes the closure of a gas/vapor pathway from the ullage space 23 to the vapor recovery system 33, which leads to a rise in ullage space pressure, causing liquid fuel to rise in the fuel filler pipe and prevent additional fuel from being added to the liquid fuel compartment 26.

In examples of the present disclosure, the predetermined maximum ullage space gas pressure allows the liquid fuel compartment 26 to receive the liquid fuel 52 via the liquid refueling port 65 at a predetermined maximum liquid fuel refueling rate. In an example, the maximum liquid fuel refueling rate may be about 15 gallons per minute. The following example is to illustrate the relationship between liquid fuel refueling rate, gas flow rate through the vapor recovery system 33, and pressure in the ullage space. If the liquid discriminating vent valve 35 is too restrictive to gas flow, the total gas pressure in the ullage space 23 may reach the predetermined maximum ullage space gas pressure before the liquid fuel compartment 26 has been filled to capacity with liquid fuel. The pressure buildup causes fuel to back up into the filler pipe and causes the liquid refueling nozzle 63 to shut off before the liquid fuel compartment 26 has been filled to capacity. During a normal liquid refueling shut-off event, when the liquid fuel 52 in the liquid fuel compartment 26 reaches a full level, vapor flow through the liquid discriminating vent valve is shut off (e.g., by a float valve), causing the pressure in the tank to rapidly build until the maximum ullage space gas pressure has been reached, causing the liquid fuel 52 to back up into the filler pipe and causing the liquid refueling nozzle 63 to shut off. In an example, the maximum ullage space gas pressure may be from about 10 inches of water to about 15 inches of water, which balances the maximum pressure of fuel standing in the fuel filler pipe.

Gas Data 78 about the gas-phase fuel 22 in the pressurizable gas-phase fuel compartment 20 is sent to the powertrain controller 40. Liquid fuel data 79 about the liquid fuel 52 in the liquid fuel compartment 26 (for example, fuel level) is sent to the powertrain controller 40. The powertrain 60 sends powertrain data 34 to the powertrain controller 40. Examples of powertrain data 34 include any data from the engine used to control the ICE 70. For example, engine speed and temperature may be powertrain data 34. The powertrain 60 includes the ICE 70. The ICE 70 depicted in FIG. 1 has a liquid fuel injector 76 in fluid communication with the liquid fuel supply tube 54 and a combustion chamber of the ICE 70 to selectably inject a predetermined quantity of the liquid fuel 52 into a combustion chamber or an intake manifold for combustion in the ICE 70. The ICE 70 depicted in FIG. 1 also has a gas-phase fuel injector 74 in fluid communication with the gas-phase fuel supply tube 84 and a combustion chamber of the ICE 70 to selectably inject a predetermined quantity of the gas-phase fuel 22 into a combustion chamber or an intake manifold for combustion in the ICE 70.

The liquid fuel injector 76 is to selectably inject a predetermined quantity of the liquid fuel 52 or a predetermined quantity of the gas-phase fuel 22 into the ICE 70 for combustion in the ICE 70. The gas-phase fuel injector 74 is to selectably inject a predetermined quantity of the gas-phase fuel 22 into the ICE 70 for combustion in the ICE 70. The powertrain controller 40 sends the powertrain control 44 to inject the liquid fuel 52, or the gas-phase fuel 22 into the ICE 70 at a predetermined rate. The powertrain control 44 includes the injector control 45 to control the gas-phase fuel injector 74; and another injector control 47 to control the liquid fuel injector 76. The vehicle controls 73 provide the demand fraction 32 to the powertrain controller 40.

The ICE 70 may be to combust the liquid fuel 52 and the gas-phase fuel 22 in separate instances of a combustion cycle. In an example, the vehicle 10 may generally use the gas-phase fuel 22 as the primary fuel for the vehicle 10. In the example, the liquid fuel 52 may serve as a reserve fuel to extend the range of the vehicle 10 beyond the range of the vehicle 10 operating on the gas-phase fuel 22. The vehicle 10 may be refueled with gas-phase fuel 22 at relatively low pressure, for example using a natural gas home refueling station up to 50 bar, and have enough range on the gas-phase fuel 22 for typical daily usage (e.g., about 40 miles). However, if additional range is required, the liquid fuel 52 may be used to fuel the ICE 70. In another example, the gas-phase fuel 22 and the liquid fuel 52 may be co-injected into the ICE 70 to be consumed together in the same combustion cycle of the ICE 70. A combustion cycle is a cyclical series of stages of operation of an internal combustion engine. For example, gasoline engines commonly have a four-stroke combustion cycle having an intake, compression, power, and exhaust stroke of a piston repeated every two revolutions of the crankshaft. A two-stroke engine is a type of internal combustion engine which completes a power cycle (combustion cycle) in only one crankshaft revolution and with two strokes of the piston. The timing and location of the fuel injection is to be compatible with the operation of the engine.

The location for injection of the gas-phase fuel 22 and the liquid fuel 52 into the ICE 70 may depend on the type of ICE 70. For example, the gas-phase fuel injector 74 and the liquid fuel injector 76 may each inject their respective fuel into an intake manifold of the ICE 70 if the liquid fuel is gasoline and the ICE 70 has spark ignition. Such an ICE 70 may be capable of running separately on the gas-phase fuel 22, the gasoline, or a combination of both the gas-phase fuel 22 and the gasoline at the same time. The gas-phase fuel 22 may be injected in an intake manifold (not shown), or in the intake of a supercharger (not shown) or turbocharger (not shown).

An example of operation of the vehicle 10 depicted in FIG. 1 is as follows: The liquid fuel 52 is delivered from the liquid refueling nozzle 63 into the liquid fuel compartment 26 of the dual fuel tank 20. In an example, the liquid refueling nozzle 63 may be a conventional liquid fuel dispensing nozzle. (See SAE Surface Vehicle Recommended Practice J285, Gasoline Dispenser Nozzle Spouts, Reaffirmed January 1999.)

Gas-phase fuel 22 may be delivered from the gas-phase fuel refueling nozzle 85 through the gas-phase fuel refueling port 82 to the pressurizable gas-phase fuel compartment 24 of the dual fuel tank 20. The pressure may be relatively low, for example, from about 2 bar to about 50 bar. However, in examples of the present disclosure, the pressurizable gas-phase fuel compartment 24 is to be pressurizable up to a maximum pressure of about 250 bar. In other examples, the maximum pressure may be lower, for example from about 2 bar to about 200 bar. For example, the maximum pressure may be about 50 bar.

Figure 2A:
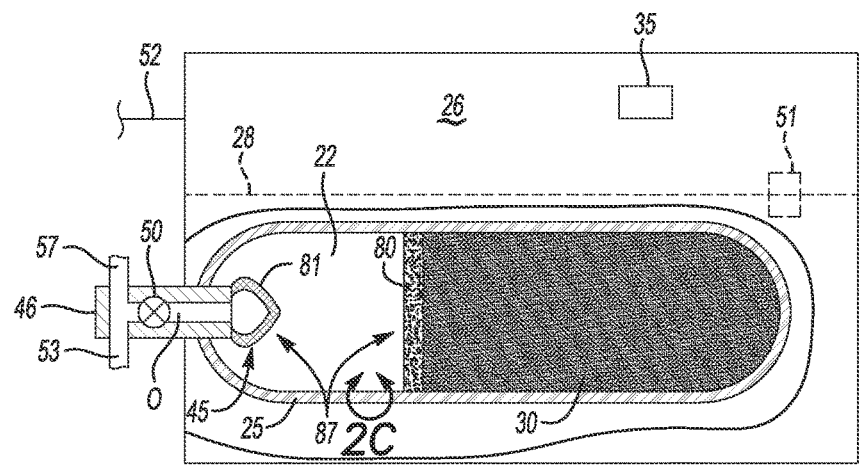
FIG. 2A is a semi-schematic top view depicting an example of a dual fuel tank according to the present disclosure.
Figure 2B:
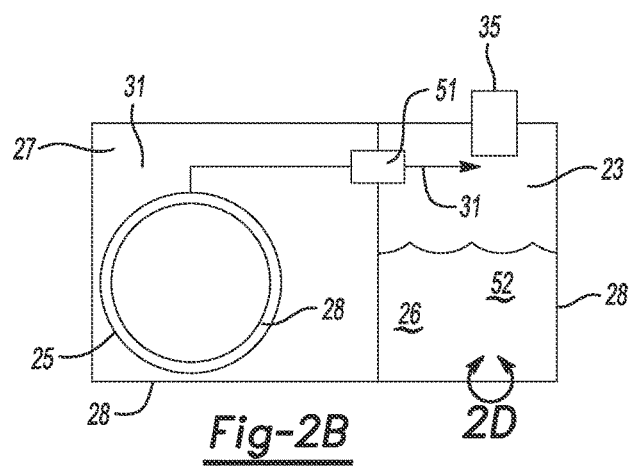
FIG. 2B is a semi-schematic side view depicting the example of the dual fuel tank depicted in FIG. 2A.
Figure 2C:
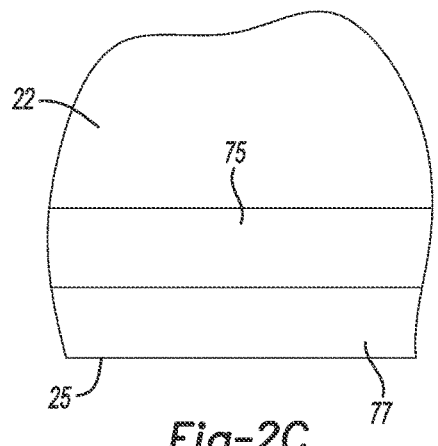
FIG. 2C is a semi-schematic section view depicting an example of a partial cross-section of a wall that defines a pressurizable gas-phase fuel compartment according to the present disclosure.

In examples of the present disclosure, the wall 25 may have a polymeric liner layer 75 and a fiber reinforcement layer 77 to support the polymeric liner layer 75 against pressure from the gas-phase fuel 22 in the pressurizable gas-phase fuel compartment 24 (See FIG. 2C).

Figure 2D:
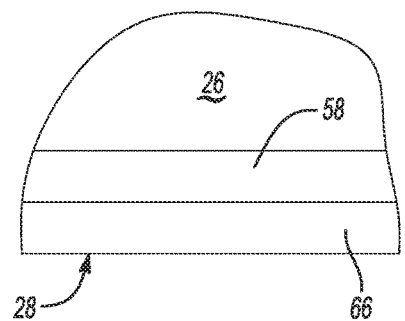
FIG. 2D is a semi-schematic section view depicting an example of a partial cross-section of a shell that envelops the pressurizable gas-phase fuel compartment and defines the liquid fuel compartment of the dual fuel tank according to the present disclosure.

As shown in FIG. 2D, the shell 28 of the dual fuel tank 20 may include a permeation barrier layer 58. In examples, the permeation barrier layer 58 may be a polymer. In an example, the permeation barrier layer 58 may be fluoropolymer. In other examples, the permeation barrier layer 58 may be metallic. For example, a thin layer (on the order of about 1 micrometer thick) of aluminum may be deposited on the shell substrate 66 by a physical vapor deposition process. Another polymer layer (not shown) may be applied to prevent chemical interaction between the aluminum and the gas-phase fuel 22 or liquid fuel 52.

Referring now to FIG. 1, FIG. 2A and FIG. 2B, over a period of time, a relatively small amount of gas-phase fuel 22 may permeate through the wall 25 and accumulate in the interstitial space 27. The permeated gas-phase fuel 31 flows through a check valve 51 from the interstitial space 27 to the liquid fuel compartment 26. In an example, the permeated gas-phase fuel 31 may flow through the check valve 51 into the ullage space 23 where the permeated gas-phase fuel 31 will mix with the evaporated vapor from the liquid fuel 52 to form a gaseous mixture 55 in the ullage space 23. The pressure in the ullage space 23 will be the sum of the partial pressure of the permeated gas-phase fuel 31 and the partial pressure of the vapor from the liquid fuel 52 plus the partial pressure from any other gases that may be present in the tank (for example, air or water vapor). The gaseous mixture 55 including the permeated gas-phase fuel 31 may be conveyed to the powertrain 60 to fuel the ICE 70.

The gas-phase fuel 22 may be substantially depleted from the pressurizable gas-phase fuel compartment 24; however, some liquid fuel 52 may remain in the liquid fuel compartment 26. The ICE 70 may be capable of continuing to run on the liquid fuel 52 until the liquid fuel compartment 26 is empty.

For a given temperature, a higher permeated gas-phase fuel partial pressure in the ullage space 23 will cause more of the permeated gas-phase fuel 31 to dissolve in the liquid fuel 52. As such, the liquid fuel 52 may be fortified with gas-phase fuel 22 dissolved therein. The fortified liquid fuel 52 will provide more vehicle range per gallon of the liquid fuel 52 compared to the liquid fuel 52 with without the gas-phase fuel 22 dissolved therein.

The vehicle 10 may be refueled with gas-phase fuel 22 at any time via the gas-phase fuel refueling port 82.

Referring now to FIGS. 2A and 2B, an example of a dual fuel tank 20 with a gas-phase fuel compartment 24 is depicted. A natural gas adsorbent 30 may be positioned within the gas-phase fuel compartment 24. While the shape of the gas-phase fuel compartment 24 shown in FIG. 2A and FIG. 2B is a cylindrical canister, it is to be understood that the shape and size of the gas-phase fuel compartment 24 may be any closed shape, depending, at least in part, on an available packaging envelope for the gas-phase fuel compartment 24 in the dual fuel tank 20 in the vehicle 10. For example, the size and shape of the dual fuel tank 20 may be complementary with a particular portion of a vehicle trunk space or underbody location.

In the example shown in FIG. 2A and FIG. 2B, the gas-phase fuel compartment 24 is a single unit having a single opening O or entrance. The opening O may be covered with a plug valve 50. The plug valve 50 may have a valve body 46 for connection to an inlet tube 53 and an outlet tube 57 for the gas-phase fuel 22. A T-fitting (not shown) for connecting the inlet tube 53 and the outlet tube 57 to the gas-phase fuel compartment 24 at the single opening O is also disclosed herein. While not shown, it is to be understood that the gas-phase fuel compartment 24 may be configured with other gas-phase fuel compartments 24 so that the plurality of gas-phase fuel compartments 24 is in fluid (e.g., gas) communication through a manifold or other suitable system of conduits and containment. For example, the gas-phase fuel compartments 24 in the plurality of gas-phase fuel compartments may be in serial fluid communication.

As illustrated in FIG. 2A and FIG. 2B, the natural gas adsorbent 30 may be positioned within the gas-phase fuel compartment 24. Suitable adsorbents 30 are at least capable of releasably retaining methane compounds (i.e., reversibly storing or adsorbing methane molecules). In some examples of the present disclosure, the adsorbent 30 may also be capable of reversibly storing other components found in natural gas, such as other hydrocarbons (e.g., ethane, propane, hexane, etc.), hydrogen gas, carbon monoxide, carbon dioxide, nitrogen gas, hydrogen sulfide, and/or water. In still other examples, the adsorbent 30 may be inert to some of the natural gas components and capable of releasably retaining other of the natural gas components.

In general, the adsorbent 30 has a high surface area and is porous. The size of the pores is generally greater than the effective molecular diameter of at least the methane compounds. In an example, the pore size distribution is such that there are pores having an effective molecular diameter of the smallest compounds to be adsorbed and pores having an effective molecular diameter of the largest compounds to be adsorbed. In an example, the adsorbent 30 has a BET surface area ranging from about 50 square meters per gram ($m^2/g$) to about 5,000 $m^2/g$, and includes a plurality of pores having a pore size ranging from about 0.20 nm (nanometers) to about 50 nm.

Examples of suitable adsorbents 30 include carbon (e.g., activated carbons, super-activated carbon, carbon nanotubes, carbon nanofibers, carbon molecular sieves, zeolite templated carbons, etc.), zeolites, metal-organic framework (MOF) materials, porous polymer networks (e.g., PAF-1 or PPN-4), and combinations thereof. Examples of suitable zeolites include zeolite X, zeolite Y, zeolite LSX, MCM-41 zeolites, silicoaluminophosphates (SAPOs), and combinations thereof. Examples of suitable metal-organic frameworks include HKUST-1, MOF-74, ZIF-8, and/or the like, which are constructed by linking structural building units (inorganic clusters) with organic linkers (e.g., carboxylate linkers).

The volume that the adsorbent 30 occupies in the gas-phase fuel compartment 24 will depend upon the density of the adsorbent 30. In an example, the density of the adsorbent 30 may range from about 0.1 g/cc (grams per cubic centimeter) to about 0.9 g/cc. A well packed adsorbent 30 may have a density of about 0.5 g/cc. In an example, a 100 L gas-phase fuel compartment 24 may include an amount of adsorbent that occupies about 50 L. For example, an amount of adsorbent that occupies about 50 L means that the adsorbent would fill a 50 L container. It is to be understood, however, that there is space available between the particles of adsorbent, and having an adsorbent that occupies 50 L in a 100 L container does not reduce the capacity of the container for natural gas by 50 L.

As depicted in FIG. 2A and FIG. 2B, examples of the present disclosure having a gas-phase fuel compartment 24 with the adsorbent 30 positioned within the gas-phase fuel compartment 24 may have a two-stage filtration system 87 disposed in the gas-phase fuel compartment 24. The two-stage filtration system 87 may be located in the gas-phase fuel compartment 24 between the adsorbent 30 and the opening O. The two-stage filtration system 87 has a first filter media 80 and a second filter media 81. The first filter media 80 is disposed adjacent to the adsorbent 30 in the gas-phase fuel compartment 24. The first filter media 80 may be inserted through the opening O by folding, rolling, and or compressing the first filter media 80. Inside the gas-phase fuel compartment 24, the first filter media 80 may unfold, unfurl, or decompress to cover the adsorbent 30. A peripheral spring (not shown) may be attached at a periphery of the first filter media 80 to urge the first filter media 80 against an inside surface of the gas-phase fuel compartment 24. The first filter media 80 may be an open cell foam, a reticulated foam, or other porous media with about 40 PPI (pores per inch) to about 90 PPI. In the example depicted in FIG. 2A, the first filter media 80 may be from about 5 mm to about 25 mm thick in the direction of flow of the gas-phase fuel during discharge from the first filter media 80. The second filter media 81 may be a fabric sack or pouch. The fabric may be woven or non-woven. The second filter media 81 may be installed at the opening O to block particles of the adsorbent 30 from exiting the gas-phase fuel compartment 24. When the gas-phase fuel 22 flows into the gas-phase fuel compartment 24 through the second filter media 81, the gas-phase fuel 22 will dislodge some of the particles of the adsorbent 30 that may have been captured by the second filter media 81 back into the gas-phase fuel compartment 24. As such, the second filter media 81 is self-cleaning.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 0.1 g/cc to about 0.9 g/cc should be interpreted to include not only the explicitly recited limits of about 0.1 g/cc to about 0.9 g/cc, but also to include individual values, such as 0.25 g/cc, 0.49 g/cc, 0.8 g/cc, etc., and sub-ranges, such as from about 0.3 g/cc to about 0.7 g/cc; from about 0.4 g/cc to about 0.6 g/cc, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A bi-fuel vehicle, comprising:
    an Internal Combustion Engine (ICE) to provide motive power to the vehicle by combustion of a liquid fuel and a gas-phase fuel;
    a dual fuel tank, including:
        a pressurizable gas-phase fuel compartment defined by a wall wherein a gas-phase fuel is permeable therethrough wherein the pressurizable gas-phase fuel compartment is to receive the gas-phase fuel, contain the gas-phase fuel, and supply the gas-phase fuel for combustion in the ICE;
        a liquid fuel compartment to receive the liquid fuel, contain the liquid fuel, and supply the liquid fuel for combustion in the ICE;
        a shell enveloping the pressurizable gas-phase fuel compartment and defining the liquid fuel compartment; and
        an interstitial space between the wall and the shell, the interstitial space in one-way fluid communication with the liquid fuel compartment wherein the interstitial space is to receive the permeated gas-phase fuel and channel the permeated gas-phase fuel to the liquid fuel compartment; and
    a vapor recovery system in fluid communication with the liquid fuel compartment.

2. The bi-fuel vehicle as defined in claim 1, further comprising:
    a liquid refueling port in fluid communication with the liquid fuel compartment to selectably interface with a liquid refueling nozzle to receive the liquid fuel from the liquid refueling nozzle;
    a gas-phase fuel refueling port in fluid communication with the pressurizable gas-phase fuel compartment to selectably interface with a gas-phase fuel refueling nozzle to receive the gas-phase fuel from the gas-phase fuel refueling nozzle;
    a gas-phase fuel supply tube to convey the gas-phase fuel from the pressurizable gas-phase fuel compartment to the ICE; and
    a liquid fuel supply tube to convey the liquid fuel from the liquid fuel compartment to the ICE.

3. The bi-fuel vehicle as defined in claim 1 wherein the liquid fuel includes a petroleum liquid fuel, a biodiesel, an alcohol, or combinations thereof.

4. The bi-fuel vehicle as defined in claim 1 wherein the gas-phase fuel is a natural gas.

5. The bi-fuel vehicle as defined in claim 2 wherein a liquid discriminating vent valve is to vent an ullage space of the liquid fuel compartment to the vapor recovery system.

6. The bi-fuel vehicle as defined in claim 5 wherein the liquid discriminating vent valve and the vapor recovery system prevent a total gas pressure in the ullage space from exceeding a predetermined maximum ullage space gas pressure except during a liquid refueling shut-off event.

7. The bi-fuel vehicle as defined in claim 6 wherein the predetermined maximum ullage space gas pressure allows the liquid fuel compartment to receive the liquid fuel via the liquid refueling port at a predetermined maximum liquid fuel refueling rate.

8. The bi-fuel vehicle as defined in claim 7 wherein the predetermined maximum liquid fuel refueling rate is about 15 gallons per minute.

9. The bi-fuel vehicle as defined in claim 1 wherein the ICE is to combust the liquid fuel and the gas-phase fuel in separate instances of a combustion cycle.

10. The bi-fuel vehicle as defined in claim 1 wherein the ICE is to combust the liquid fuel and the gas-phase fuel together in a same combustion cycle.

11. The bi-fuel vehicle as defined in claim 1 wherein the liquid fuel in the liquid fuel compartment has a portion of the permeated gas-phase fuel dissolved therein.

12. The bi-fuel vehicle as defined in claim 1 wherein the bi-fuel vehicle is to have an emission of hydrocarbon less than about 2 grams when tested in accordance with a diurnal plus hot soak test procedure based on a Sealed Housing for Evaporative Determination as set forth in Title 40, Code of Federal Regulations, sections 86.130-78 through 86.143-90 as they existed Jul. 1, 1989.

13. A dual fuel tank for a bi-fuel vehicle, the dual fuel tank comprising:
  a pressurizable gas-phase fuel compartment defined by a wall wherein a gas-phase fuel is permeable therethrough wherein the pressurizable gas-phase fuel compartment is to receive the gas-phase fuel, contain the gas-phase fuel, and supply the gas-phase fuel for combustion in an internal combustion engine (ICE) disposed in the vehicle;
  a liquid fuel compartment to receive liquid fuel, contain the liquid fuel, and supply the liquid fuel for combustion in the ICE;
  a shell enveloping the pressurizable gas-phase fuel compartment and defining the liquid fuel compartment; and
  an interstitial space between the wall and the shell, the interstitial space in one-way fluid communication with the liquid fuel compartment wherein the interstitial space is to receive the permeated gas-phase fuel and channel the permeated gas-phase fuel to the liquid fuel compartment.

14. The dual fuel tank as defined in claim 13 wherein:
  the liquid fuel compartment is to receive the liquid fuel from a liquid refueling nozzle via a liquid refueling port in fluid communication with the liquid fuel compartment;
  the pressurizable gas-phase fuel compartment is to receive the gas-phase fuel from a gas-phase fuel refueling nozzle via a gas-phase fuel refueling port in fluid communication with the pressurizable gas-phase fuel compartment;
  a gas-phase fuel supply outlet port to convey the gas-phase fuel from the pressurizable gas-phase fuel compartment to a gas-phase fuel supply tube for conveying the gas-phase fuel to the ICE; and
  a liquid phase fuel supply outlet port to convey the liquid fuel from the liquid fuel compartment to a liquid phase fuel supply tube for conveying the liquid phase fuel to the ICE.

15. The dual fuel tank as defined in claim 13 wherein the pressurizable gas-phase fuel compartment is to be pressurizable up to about 250 bar.

16. The dual fuel tank as defined in claim 13 wherein the wall has a polymeric liner layer and a fiber reinforcement layer to support the polymeric liner layer against pressure from the gas-phase fuel in the pressurizable gas-phase fuel compartment.

17. The dual fuel tank as defined in claim 16 wherein the shell includes a permeation barrier layer.

18. The dual fuel tank as defined in claim 17 wherein the permeation barrier layer is a polymer.

19. The dual fuel tank as defined in claim 17 wherein the permeation barrier layer is metallic.

20. The dual fuel tank as defined in claim 13 wherein the dual fuel tank is to have an emission of hydrocarbon less than about 0.01 grams when tested in accordance with a diurnal plus hot soak test procedure based on a Sealed Housing for Evaporative Determination as set forth in Title 40, Code of Federal Regulations, sections 86.130-78 through 86.143-90 as they existed Jul. 1, 1989.

* * * * *